US009946579B2

(12) United States Patent
Pack

(10) Patent No.: US 9,946,579 B2
(45) Date of Patent: Apr. 17, 2018

(54) SYSTEMS AND METHODS FOR LOAD BALANCING OF TIME-BASED TASKS IN A DISTRIBUTED COMPUTING SYSTEM

(71) Applicant: Adobe Systems Incorporated, San Jose, CA (US)

(72) Inventor: Brandon John Pack, Sandy, UT (US)

(73) Assignee: Adobe Systems Incorporated, San Jose, CA (US)

( * ) Notice: Subject to any disclaimer, the term of this patent is extended or adjusted under 35 U.S.C. 154(b) by 424 days.

(21) Appl. No.: 14/660,036

(22) Filed: Mar. 17, 2015

(65) Prior Publication Data

US 2016/0274953 A1    Sep. 22, 2016
US 2017/0242734 A9    Aug. 24, 2017

Related U.S. Application Data

(63) Continuation of application No. 13/555,244, filed on Jul. 23, 2012, now Pat. No. 9,047,129.

(51) Int. Cl.
*G06F 9/50*   (2006.01)

(52) U.S. Cl.
CPC ................... *G06F 9/5083* (2013.01)

(58) Field of Classification Search
None
See application file for complete search history.

(56) References Cited

U.S. PATENT DOCUMENTS

| 6,032,172 A  * | 2/2000  | Kutcher ............... G06F 9/4881 718/100 |
| 6,223,205 B1 * | 4/2001  | Harchol-Balter ....... G06F 9/505 718/102 |
| 6,377,975 B1 * | 4/2002  | Florman .................. G06F 9/505 709/203 |
| 7,640,548 B1 * | 12/2009 | Yu .................... G06Q 10/06316 705/7.26 |
| 8,019,870 B1 * | 9/2011  | Eppstein ............. H04L 41/5051 709/220 |
| 8,521,923 B2 * | 8/2013  | Lee ....................... G06F 3/0611 710/36 |
| 3,034,698 A1   | 12/2013 | Bruno et al. |
| 2003/0217077 A1 * | 11/2003 | Schwartz .......... G06F 17/30067 |

(Continued)

OTHER PUBLICATIONS

Notice of Allowance in related U.S. Appl. No. 13/555,244, dated Jan. 30, 2015, 12 pages.

*Primary Examiner* — Mehran Kamran
(74) *Attorney, Agent, or Firm* — Kilpatrick Townsend & Stockton LLP

(57) ABSTRACT

A load manager comprises a configuration manager and a load monitor. The load manager is configured to monitor and manage aspects of a distributed computer system comprising a plurality of servers. Each server is configured to perform tasks according to a respective time-based scheduler configuration. In some embodiments, the load monitor monitors one or more load metrics of each of the one or more servers. In response to one or more load metrics exceeding a threshold, the configuration manager determines the current time-based task scheduler configuration of the server exceeding the threshold. The load manager is further configured to modify the time-based task scheduler configuration to adjust a further task load on the server based on the at least one or more load metrics.

13 Claims, 8 Drawing Sheets

(56) References Cited

U.S. PATENT DOCUMENTS

| | | | | |
|---|---|---|---|---|
| 2003/0217093 A1* | 11/2003 | Dailey | G06F 9/4887 | 718/107 |
| 2004/0215747 A1* | 10/2004 | Maron | H04L 67/1095 | 709/220 |
| 2005/0034126 A1* | 2/2005 | Moore | G06F 9/4887 | 718/100 |
| 2005/0132372 A1* | 6/2005 | Vargas | G06F 1/3203 | 718/100 |
| 2007/0005662 A1* | 1/2007 | Bankston | G06F 17/30575 | |
| 2007/0220514 A1* | 9/2007 | Sugimoto | G06F 3/061 | 718/100 |
| 2007/0300224 A1* | 12/2007 | Aggarwal | G06Q 10/06 | 718/100 |
| 2008/0052712 A1* | 2/2008 | Gustafson | G06F 9/505 | 718/101 |
| 2008/0209044 A1* | 8/2008 | Forrester | G06F 9/505 | 709/226 |
| 2008/0306950 A1* | 12/2008 | Richards | G06F 9/505 | |
| 2009/0100158 A1* | 4/2009 | Sonkin | H04L 41/0856 | 709/221 |
| 2009/0183162 A1* | 7/2009 | Kindel | G06F 9/4843 | 718/103 |
| 2010/0030791 A1* | 2/2010 | Iverson | G06F 17/30147 | 713/320 |
| 2010/0211959 A1* | 8/2010 | Chan | G06F 11/0757 | 718/107 |
| 2010/0274885 A1* | 10/2010 | Yoo | H04L 67/1008 | 709/224 |
| 2012/0030346 A1* | 2/2012 | Fukuda | G06F 11/0709 | 709/224 |
| 2012/0109984 A1* | 5/2012 | Clark, Jr. | G06Q 10/06 | 707/754 |
| 2012/0173477 A1* | 7/2012 | Coutts | G06F 17/30306 | 707/602 |
| 2013/0055276 A1* | 2/2013 | Park | G06F 9/4887 | 718/103 |
| 2013/0139176 A1* | 5/2013 | Kang | G06F 9/5083 | 718/105 |
| 2013/0191555 A1* | 7/2013 | Liu | G06F 3/061 | 710/5 |
| 2013/0346988 A1* | 12/2013 | Bruno | G06F 9/5066 | 718/102 |
| 2014/0026144 A1* | 1/2014 | Pack | G06F 9/505 | 718/105 |
| 2014/0068618 A1* | 3/2014 | Lin | G06F 9/4446 | 718/101 |
| 2014/0229590 A1* | 8/2014 | Bennah | G06F 11/2025 | 709/221 |
| 2014/0281918 A1* | 9/2014 | Wei | H04L 67/02 | 715/234 |

* cited by examiner

Distributed Computing System Task Reports

>> *Number of Active Tasks by Name* — 600

| Task Name | No. of Jobs | No. of Servers |
|---|---|---|
| AddActionProcessor | 5 | 1 |
| AddImageActionProcessor | 5 | 1 |
| AddGenActionProcessor | 5 | 1 |
| BidRuleApplicationActionProcessor | 5 | 1 |
| BidRuleResultsSummary | 0 | 1 |
| Bin/php | 11 | 9 |
| BulkActionProcessor | 5 | 1 |
| DI_report_kill.php | 0 | 1 |
| ExportFlaggedClassifications | 0 | 1 |
| InventoryManagementActionProcessor | 5 | 1 |
| LandingPageActionProcessor | 5 | 1 |
| master_action_processor.php | 15 | 1 |
| OptimineReportActionProcessor | 1 | 1 |
| OrganicTrackingCodeMonitor | 0 | 1 |
| OtherActionProcessor | 10 | 1 |
| OtherImageActionProcessor | 5 | 1 |
| sandbox_devzone.php | 0 | 5 |
| ScriptActionProcessor | 5 | 1 |
| sendAlerts.php | 0 | 1 |
| sendAlertsDispatcher.php | 0 | 1 |
| shared.php | 0 | 1 |
| SynActionProcessor | 15 | 2 |
| TrackingCodeMonitor | 0 | 1 |
| TrackingCodeMonitor>/dev/null | 0 | 1 |

>> *Inactive Tasks* — 610

[ Add new tasks to distributed computing system ]

*FIG. 6*

SYSTEMS AND METHODS FOR LOAD BALANCING OF TIME-BASED TASKS IN A DISTRIBUTED COMPUTING SYSTEM

CROSS-REFERENCE TO RELATED APPLICATION

This application is a continuation application of U.S. patent application Ser. No. 13/555,244 filed on Jul. 23, 2012, the contents of which are incorporated herein in their entirety.

BACKGROUND

Distributed computing systems may include computers grouped together via a network to work on a common objective. Often each computer operates autonomously within the network on a job that has been divided into many tasks. By dividing a problem into many tasks across many computers, the processing time for the problem can be reduced. Distributed computing systems are also useful in applications where data produced in one location is used in another location. An example of distributed computing systems is a distributed network file system, such as those found in a corporate network connecting multiple users computers. Another example of a distributed computing system is a distributed database or distributed information processing system. A distributed database may have data in multiple locations that multiple computers in a network access when performing tasks. A distributed information processing system may be a cloud computing environment or a network based service such as on-line banking, social media, or internet marketing.

In distributed systems, there may be a common set of jobs or tasks that are performed periodically (e.g., daily, hourly, etc.). Each computer (e.g., server) in a distributed computing network may be configured with a feature implemented to automatically execute a certain set of jobs at a given time and/or date. The jobs may execute on a periodic basis in the background of the distributed computing network. The data for the jobs may be received from multiple locations or from a shared job queue, for example. A crontab is an example of a feature implemented to automatically execute jobs. A crontab is a configuration installed on each computer (e.g., server) in a distributed computing system in which each entry in the crontab describes a job. Each entry also includes a date and/or time for executing the task and the command(s) to execute.

While the automation of jobs within a distributed computing system is useful, monitoring and management of loading of the jobs in the system is currently inadequate.

SUMMARY

Various embodiments of methods and systems for load balancing of time- based tasks are presented. In some embodiments, one or more servers perform tasks according to a respective time-based task scheduler configuration. In some embodiments, a load manager monitors and balances the load for the one or more servers. One or more load metrics of each of the one or more servers are monitored. In response to at least one of the one or more load metrics of the one or more servers exceeding a threshold, a configuration manager determines the current time-based task scheduler configuration of the server exceeding the threshold. The load manager modifies the time-based task scheduler configuration of the server exceeding the threshold to adjust a future task load on the server based on the one or more load metrics. In some embodiments, if the one or more load metrics indicates a server is overloaded, the load manager decreases the future task load for the server. In some embodiments, if the one or more load metrics indicates a server is underutilized, the load manager increases the future task load for the server.

In some embodiments, a report representing the configuration of each of the servers in the distributed computing system is generated. In some embodiments, the central configuration inventory is accessed to obtain the time-based task scheduler configuration for the plurality of servers. A report is generated indicating the plurality of job types for a plurality of servers, and a number of jobs for each job type configured to be performed by the plurality of servers, in some embodiments.

BRIEF DESCRIPTION OF THE DRAWINGS

FIG. 6 is a chart depicting a report of tasks per server in a distributed computer system, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, embodiments provide systems and methods for load balancing of time-based tasks in a distributed computing system. In some embodiments, one or more load metrics of each of one or more servers are monitored by a load monitor. The one or more servers are each performing tasks according to a respective time-based task scheduler configuration. In some embodiments, in response to at least one of the one or more load metrics of at least one of the one or more servers exceeding a threshold, a configuration manager determines the current time-based task scheduler configuration of the server exceeding the threshold. The load manager modifies the time-based task scheduler configuration of the server exceeding the threshold to adjust a future task load on the server based on the at least one of the one or more load metrics.

Figure 1:
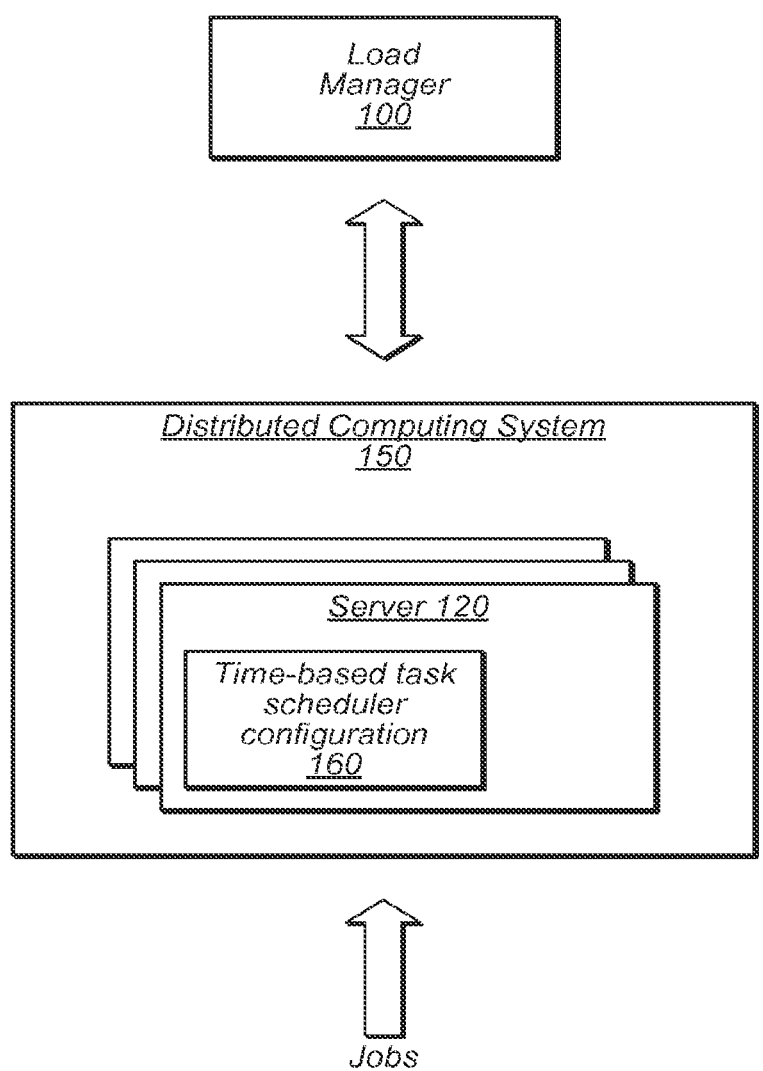
FIG. 1 illustrates a configuration that supports load balancing of time-based tasks in a distributed computing system, according to one embodiment.

FIG. 1 illustrates a configuration that supports load balancing of time-based tasks in a distributed computing system, according to one embodiment. In general, a distributed computing system 150 includes one or more computers each configured as a server 120. Each server 120 includes a respective time-based task scheduler configured according to a respective time-based task scheduler configuration 160. Each respective time-based task scheduler is configured to execute one or more time-based tasks at a given date and/or time according to its respective configuration 160. In addition, each server may be configured with different time-based tasks, the same time based tasks, or a combination thereof. Each server performs tasks according to its time-based task scheduler configuration. For example, a server may be configured to retrieve ten jobs of a given task at a scheduled time interval. A load manager 100 is configured to monitor and balance the load of the distributed computing system 150. For example, load manager 100 monitors the health of each server through the server's system metrics (e.g., CPU usage, memory usage, etc.). In some embodiments load manager 100 is configured as a configuration manager and a load manager on one or more computing devices (e.g., computers, servers). This will be described in further detail below. In response to indications that a server is overloaded or underutilized, load manager 100 modifies the time-based task configuration to adjust future loads appropriately. For example, a server 120 that is over utilized will have its time-based task scheduler configuration changed to lower future loads so that the server can recover from its overloaded state. In some embodiments, a report is presented on a user interface to indicate the current status of servers 120 in distributed computing system 150. In some embodiments, a user or administrator can select via the user interface to configure the time-based task scheduler of one or more servers with new tasks. This will be described in further detail below.

In some embodiments, distributed computing system 150 includes one or more computers or servers 120 coupled via a network. Distributed computing system 150 may receive jobs from multiple sources. For example, jobs may be received directly from clients, from another computing system or from a shared job queue. Servers 120 are connected via a network and can be in the same or separate geographic locations, in some embodiments. Although the servers are connected via a network, servers 120 may autonomously perform one or more tasks according to a time-based task scheduler 160. In some embodiments, servers 120 are not each configured with the same tasks. For example, a small portion (e.g., 5 of 30) of servers may be configured with a given task 1 and another small portion (e.g. 3 of 30) of servers may be configured with a given task 2. However, the two groups of servers may both be configured with a given task 3. In addition, although one or more servers can be configured with the same task, the frequency and the batch size (e.g., the number of jobs the server can retrieve) may differ. It should be noted that any number of tasks in any combination may be implemented in servers 120 for a given distributed computing system 150.

In some embodiments, each server 120 has a respective time-based task scheduler configuration 160 implemented. Time-based task scheduler configuration 160 includes information about the frequency one or more tasks may be performed, the type of tasks the server is configured to perform, and how many jobs (e.g., batch size) to retrieve at one time. In response to one or more load metrics exceeding a threshold, a load manager and/or a configuration manager may modify the time-based task scheduler to adjust the future load.

In some embodiments, load manager 100 is implemented on one or more computing devices and configured to balance the load on servers 120 in distributed computing system 150. Load manager 100 is configured to monitor the health of the individual servers through the load metrics of each individual server. Load metrics may be, as a non-limiting example, CPU usage, memory usage and/or disk usage of each server 120. Based on the load metrics, load manager 100 modifies the time-based task scheduler configuration for an individual server to balance the load. For example, if the load metrics for a particular server indicate that the server is overloaded, load manager 100 modifies the time-based task scheduler to reduce the future load on the server. Conversely, if the load metrics for a particular server indicate that a particular server is underutilized, load manager 100 modifies the time-based task scheduler to increase the future load on the particular server.

In one example application, a distributed computing system may be implements as a network-based service configured to manage a search engine marketing (SEM) campaign. In a search engine marketing campaign a business owner or a marketing firm bids on keywords to ensure that the business and/or product page appears in the upper box or right side box of a search engine results page. When a user enters a keyword into the search engine, if the business has placed the appropriate bid on the key word, an advertisement associated with the business may appear in the search engine results. In an example SEM campaign with one million keywords, a file with the list of keywords may be sent to a distributed computing network configured as a network-based server. Within the distributed network one or more servers configured with a time-based task to bid on keywords on a search engine website (e.g., GOOGLE™, Bing™) may receive a portion of the keywords to bid on. For example, thirty servers may be configured to receive fifty keywords, respectively, to bid on at a time, among other time-based tasks. However, the servers may not have equal capacity and the interfaces to the various search engine websites may vary in speed. A load manager can monitor the load metrics of each server and manage the load of an individual server. For example, a server currently retrieving fifty keywords every five minutes to bid on may be overloaded as indicated by the load metrics associated with the server. The load manager may decrease the future load of the server by modifying the frequency to every ten minutes in the time-based task scheduler configuration for the server.

In another example, a distributed computing system, configured as a network-based financial service, may have a main location for the service, a satellite location and an on-line presence to allow clients to manage their funds. The financial services company may also continually update databases or other information sources with data received from worldwide markets. The financial services company may implement time-based tasks to periodically update the internal databases with worldwide market data. In addition, the financial services company may have time-based tasks to analyze stock values and various puts, calls, buys and/or sells for an individual client and/or stock to determine if action is needed. The time-based tasks for these and others may be distributed across many servers some of which may be in geographically different location. A load manager may monitor the load metrics of each of the servers performing the tasks in order to ensure that trades are completed on time and the data from the worldwide markets is accurate, for example. If a server is overloaded and not completing tasks quickly, the load manager may configure the server to retrieve fewer jobs in the future. In addition, if one of the servers is underutilized, the load manager may configure the server to retrieve more jobs in the future.

To continue the SEM example above, a marketer may have changes to the SEM campaign for a business. The marketer may have one thousand keywords to bid on in two search engines. Each server configured with the key word bid task is configured to retrieve a job including fifty keywords and execute the key word bid at a given frequency (e.g. every five minutes). The load manager monitors each server as it is completing the task. A CPU usage metric for a particular server may indicate that the server is overloaded. For example, one search engine's key word bid process may be slower than another, such that tasks associated with an associate search engine site are slower. In response to determining that the given server is overload, the load manager modifies the time-based task scheduler configuration to modify the job retrieval frequency. Once the server has recovered, the load manager may modify the time-based task scheduler configuration back to the original frequency.

Figure 2:
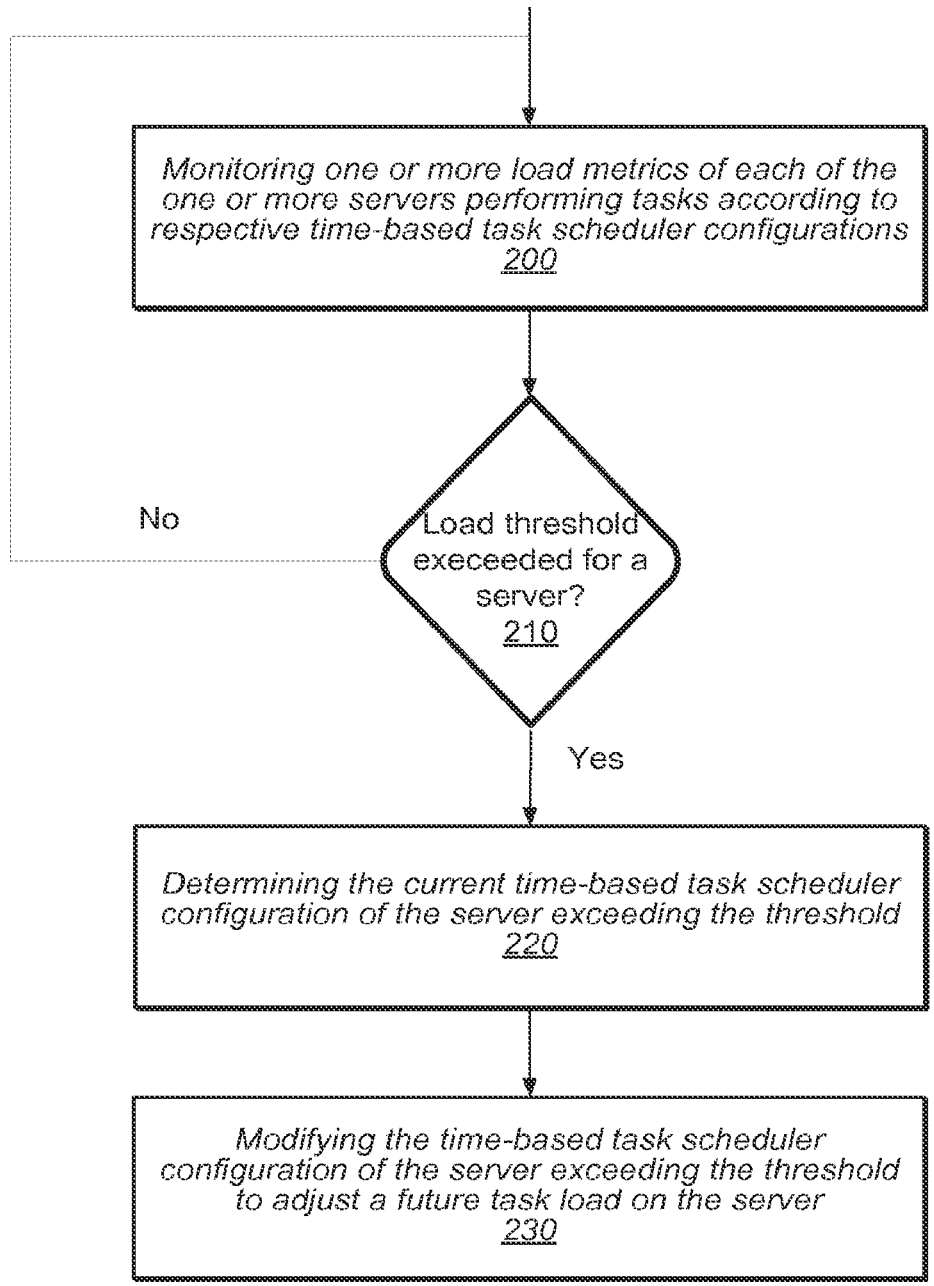
FIG. 2 is a flowchart of a method for load balancing of time-based tasks in a distributed computing system, according to one embodiment.

FIG. 2 is a flowchart of a method for load balancing of time-based tasks in a distributed computing system, according to one embodiment. In general, in some embodiments, a distributed computing system (e.g. distributed computing system 150 in FIG. 1) is configured with one or more servers (e.g. servers 120 in FIG. 1) executing one or more tasks according to a time-based task scheduler configuration (e.g. time-based task scheduler configuration 160 in FIG. 1). A distributed computing system may be used to process large amounts of data in a timely manner by dividing up the data amongst multiple servers. A load manager (e.g., load manager 100 in FIG. 1) is implemented on one or more computers in some embodiments to balance the load on the servers executing the tasks. In some embodiments, the load manager monitors the health of each server via the load metrics of the server (e.g., CPU usage, memory usage, etc.) and modifies the server's time-based task scheduler, if necessary, based on the load metrics.

As indicated in 200, in some embodiments, one or more load metrics of each of the one or more servers performing tasks according to respective time-based task scheduler configurations are monitored. As discussed above, as non-limiting examples, load metrics may include CPU usage, disk usage, network bandwidth usage, or memory usage. Each server may be configured with a given set of tasks to perform according to a time-based task scheduler. As each server performs the tasks at the frequency indicated by the time-based task scheduler, the load metrics of each server may be monitored.

As indicated in 210, in some embodiments, the load metrics are evaluated to determine if a load metric has exceeded a load threshold for a given server. For example, if the load metric is too high or exceeds a load threshold for maximum usage on a given server, this may indicate that the server is overloaded. As another example, if the load metric for a given server is too low or below a given load threshold for minimum usage, this may indicate that the server is underutilized. In the case that the load threshold is not exceeded, the load metrics will be further monitored (e.g., as indicated in 200). In some embodiments, multiple different thresholds may be employed, such as an over utilized threshold and an underutilized threshold.

As indicated in 220, in some embodiments, the current time-based task scheduler configuration of the server exceeding the threshold is determined. In some embodiments, the current time-based task scheduler configuration of the server may be determined by load monitor 100 logging into the server and reading the time-based task scheduler on the server. In alternate embodiments, a database, a central repository, or a file with a list of configurations is maintained.

As indicated in 230, in some embodiments, the time-based task scheduler configuration of the server exceeding the threshold is modified to adjust a future task load on the server. For example, if the load metrics exceeding a threshold as determined in 210 indicate that the server is overloaded, load manager 100 may modify the server's time-based task scheduler configuration 160 to reduce the future load of the server. Alternatively, if the load metrics exceeding a threshold as determined in 210 indicate that the server is underutilized, the time-based task scheduler configuration may be modified to increase the future load of the server.

Figure 3:
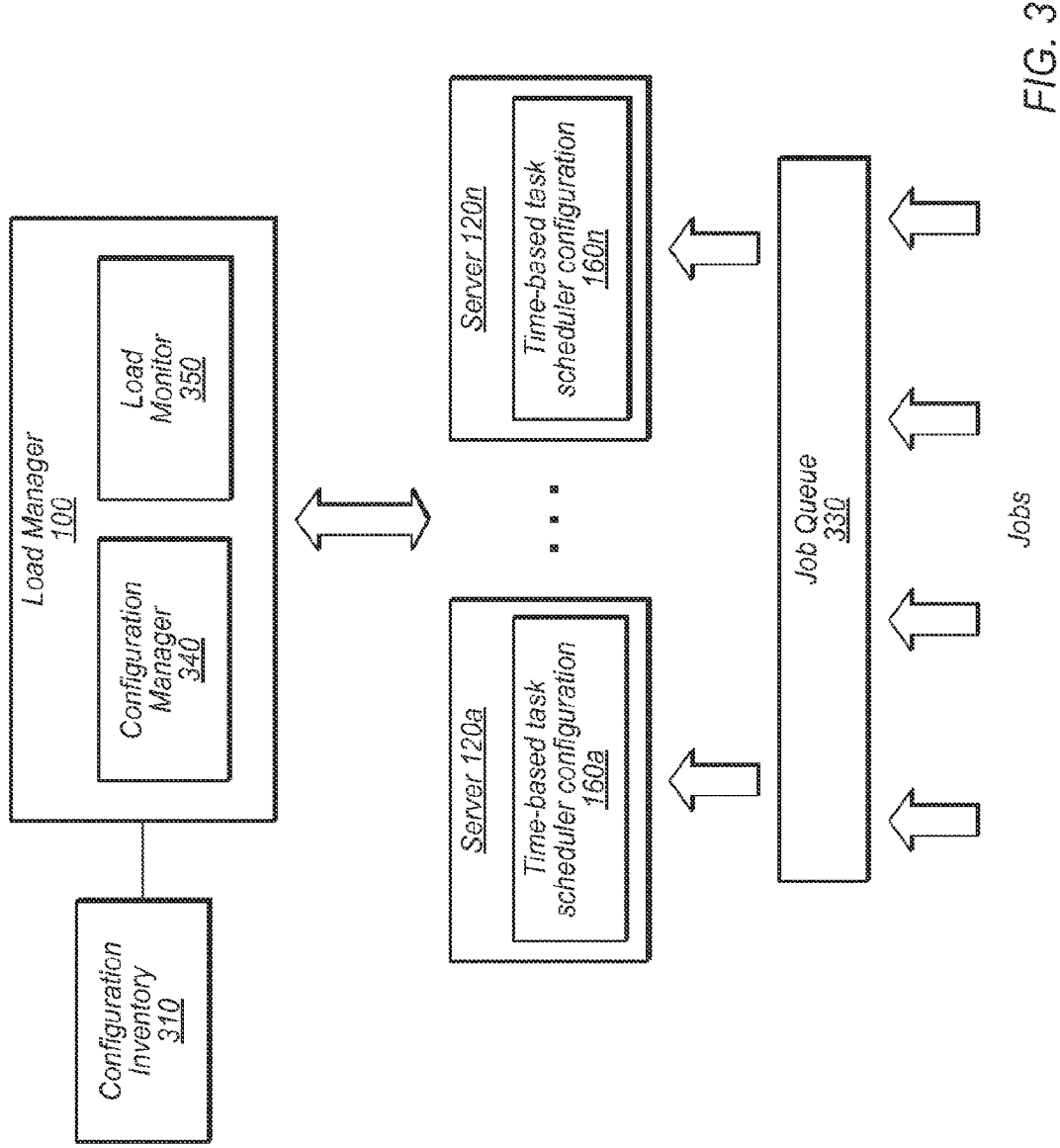
FIG. 3 illustrates a configuration manager and a load monitor for managing load balancing of time-based tasks in a distributed computing system, according to one embodiment.

FIG. 3 illustrates a configuration of a configuration manager and a load monitor for managing load balancing of time-based tasks in a distributed computing system, according to one embodiment. In general, a load manager is configured to monitor and balance the load of one or more servers in a distributed computing system. The load manager, in some embodiments, maintains a centralized configuration inventory including the current time-based task scheduler configuration for each of the servers. In some embodiments, the load manager includes a configuration manager and a load monitor implemented on one or more computers. The load manager monitors the load metrics of the one or more servers and notifies the configuration manager of any servers that exceed a given threshold. The configuration manager modifies the time-based task scheduler configuration based on the load metrics, in some embodiments. Each of the one or more servers is configured to perform a given number of tasks according to a time-based task scheduler configuration. Each server retrieves jobs from a job queue according to the server's time-based task scheduler configuration.

In some embodiments, load manager 100 is configured to monitor and balance the load of one or more servers performing tasks according to a time-based task scheduler. Load manager 100 is implemented on one or more computers and in some embodiments implemented separately from servers 120. Load manager 100 maintains a configuration inventory 310, in some embodiments. Configuration inventory 310 stores the current configuration of the time-based task scheduler configurations for servers 120 in a centralized location. Maintaining a centralized configuration inventory 310 allows load manager 100 to determine the current time-based task scheduler configuration without logging into each individual server 120. Load manager 100, in some embodiments, is implemented including a configuration manager 340 and a load monitor 350.

In some embodiments, load monitor 350 is implemented to monitor the load metrics of one or more servers 120. Examples of load metrics may be, but are not limited to, CPU usage, memory usage, network bandwidth usage, and/or disk usage. Load monitor 350 may determine the current load metrics using built-in features of the operating system of servers 120. For example, in the Unix operation system, system commands such as "top", "sar", "mpstat" or "jobs" provide data regarding the current status of CPU, memory, etc. For example, "top" shows current data of CPU and memory usage regarding the processes (e.g., tasks) currently running on server 120. As another example, the command "mpstat" provides statistics per processor for a given server. If load monitor 350 determines that the metrics of a given server exceed a threshold (e.g., maximum or minimum usage), load monitor 350 notifies configuration manager 340, in some embodiments.

In some embodiments, configuration manager 340 is implemented to modify the time-based task scheduler configuration for one or more servers in order to maintain the load balance for a distributed computing system (e.g., distributed computing system 150 in FIG. 1). In response to receiving notification that a server has exceeded a load threshold, configuration manager 340 determines the current time-based task scheduler configuration for the server exceeding the threshold. In some embodiments, configuration manager 340 determines the current time-based task scheduler configuration from configuration inventory 310. However, in alternate embodiments, configuration manager 310 may log into the server exceeding the threshold to determine the current time-based task scheduler configuration. Based on the load threshold that the particular server 120 is exceeding, configuration manager 340 modifies the time-based task scheduler configuration 160. For example, if the particular server's 120 load metrics indicate that the particular server 120 is exceeding a predetermined threshold of maximum usage for a given metric (e.g., CPU usage, memory usage), configuration manager 340 may then modify the time-based task scheduler configuration 160 to decrease the future load on the particular server. As another example, if the particular server's 120 load metrics indicate that the particular server 120 is exceeding a predetermined threshold of minimum usage for a given metric (e.g., CPU usage, memory usage), configuration manager 340 may then modify the time-based task scheduler configuration 160 to increase the future load on the particular server.

As discussed above, in some embodiments, a distributed computing network includes one or more servers 120 configured to perform tasks according to a time-based task scheduler configuration. Servers 120 are connected via a network, in some embodiments. Servers 120 may be located in the same geographic location or in multiple geographic locations. Each server 120 is configured to perform one or more tasks according to a time-based task scheduler configuration 160. Each server 120 retrieves jobs from job queue 330 based on time-based task scheduler configuration 160. For example a particular server may be configured with three tasks to be performed at a given frequency. Task 1 is scheduled on one minute intervals. Thus, every minute, the particular server 120 retrieved a job from the job queue for task 1.

In some embodiments, a time-based task scheduler is implemented in each of the one or more servers 120. Time-based task scheduler configuration 160 includes information on how often a given task is to be performed and how many of jobs (e.g., batch size) for a given task may be performed. For example, time-based scheduler may be configured to perform five particular tasks and retrieve three of each task from the job queue according to the frequency (e.g., daily, hourly) indicated in the time-base scheduler 160 configuration.

Figure 4:
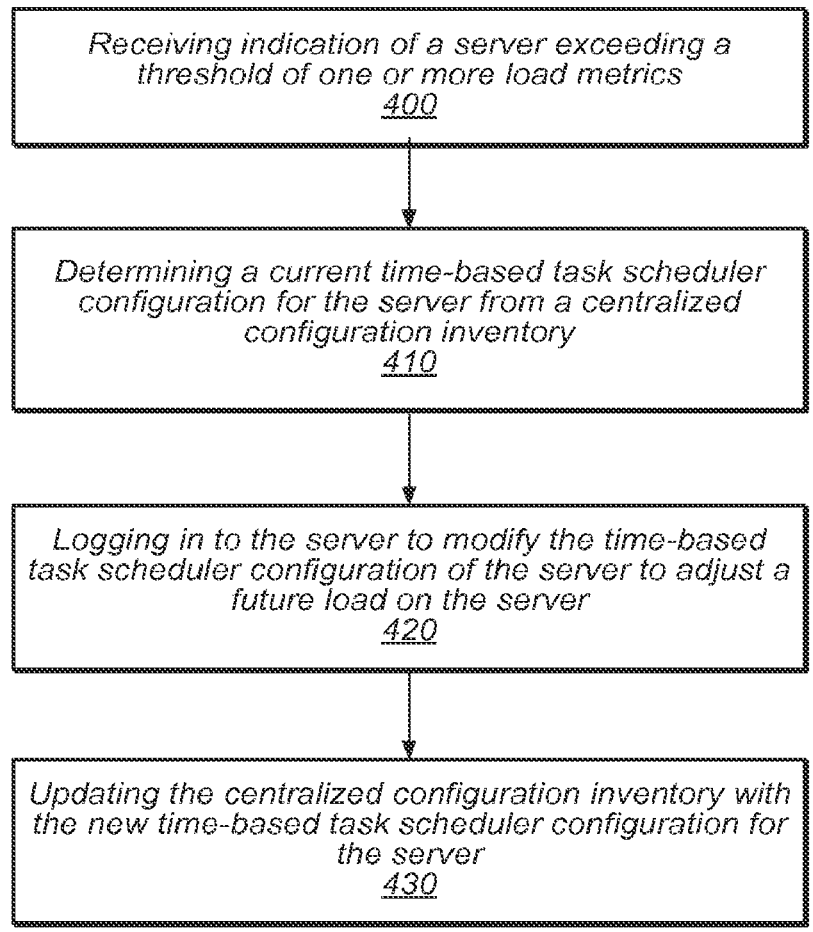
FIG. 4 is a flowchart of a method for a configuration manager to modify a time-based task scheduler configuration in a server, according to one embodiment.

FIG. 4 is a flowchart of a method for a configuration manager to modify a time-based task scheduler configuration in a server, according to one embodiment. As discussed above, the load balance of one or more servers is managed (e.g., by configuration manager 340 in FIG. 3). In response to one or more servers (e.g., servers 120 in FIG. 3) exceeding a threshold, the time-based task scheduler for the one or more servers exceeding a threshold of load metrics may be modified to adjust the future load on the server. For example, the number of jobs that a particular server retrieves (e.g., from job queue 330 in FIG. 3) at a given frequency may be adjusted based on the load metrics of that particular server. As another example, the frequency of jobs may be adjusted based on the load metrics of the particular server.

As indicated in 400, in some embodiments, indication that a server is exceeding a threshold of one or more load metrics is received (e.g., from load monitor 350 in FIG. 3). The indication may be that one or more servers are overloaded, for example, based on one or more metrics exceeding a maximum usage threshold. The indication may be that one or more servers are underutilized based on one or more metrics exceeding a minimum usage threshold, for example.

As indicated in 410, in some embodiments, the current time-based task scheduler configuration for the server may be determined (e.g., by configuration manager 340 in FIG. 3) from a centralized configuration inventory (e.g. configuration inventory 310 in FIG. 3). As discussed above, the current time-based task scheduler configuration indicates the type of tasks the respective server is configured to perform, how often each task is to be performed and the number of a jobs for a given type of task the server can retrieve from the job queue (e.g., job queue 330 in FIG. 3).

As indicated in 420, in some embodiments, the server (e.g., the server exceeding the threshold) is logged into (e.g., by configuration manager 340) in order to modify the time-based task scheduler configuration (e.g., time-based task scheduler configuration 160 in FIG. 3) of the server to adjust a future load on the server (e.g., server 120 in FIG. 3). In some embodiments, the number of jobs for a given type of task the server can retrieve from the job queue is altered. For example, if the server is overload, as indicated by its load metrics, the number of jobs for a given type of task the server can retrieve from the job queue is reduced. As another example, if the server is underutilized, as indicated by its load metrics, the number of jobs for a given type of task the server can retrieve from the job queue is increased. In other embodiments, other aspects such as the type of task or the frequency of the task of the time-based task scheduler configuration are modified. For example, if a given task consistently over loads a given server, the time-based task scheduler may be configured to no longer retrieve the given type of task.

As indicated in 430, in some embodiments, the centralized configuration inventory is updated with the new time-based task scheduler configuration for the server. As discussed above, the centralized configuration inventory (e.g., centralized configuration inventory 310 in FIG. 3) includes the current configuration of each of the one or more servers in a distributed computing system (e.g., distributed computing system 150 in FIG. 1). Once the server has been logged into (e.g., by configuration manager 340 in FIG. 3) and the modification made to its time-based scheduler configuration, the new time-based task scheduler configuration is stored in the centralized configuration inventory. As discussed above, in some embodiments, maintaining a centralized configuration inventory enables querying the current time-based task scheduler configuration for one or more servers without logging into each server. In addition, summaries of the current configuration of the servers in the distributed computing system can be displayed without logging into each server. This will be discussed in more detail below.

Figure 5:
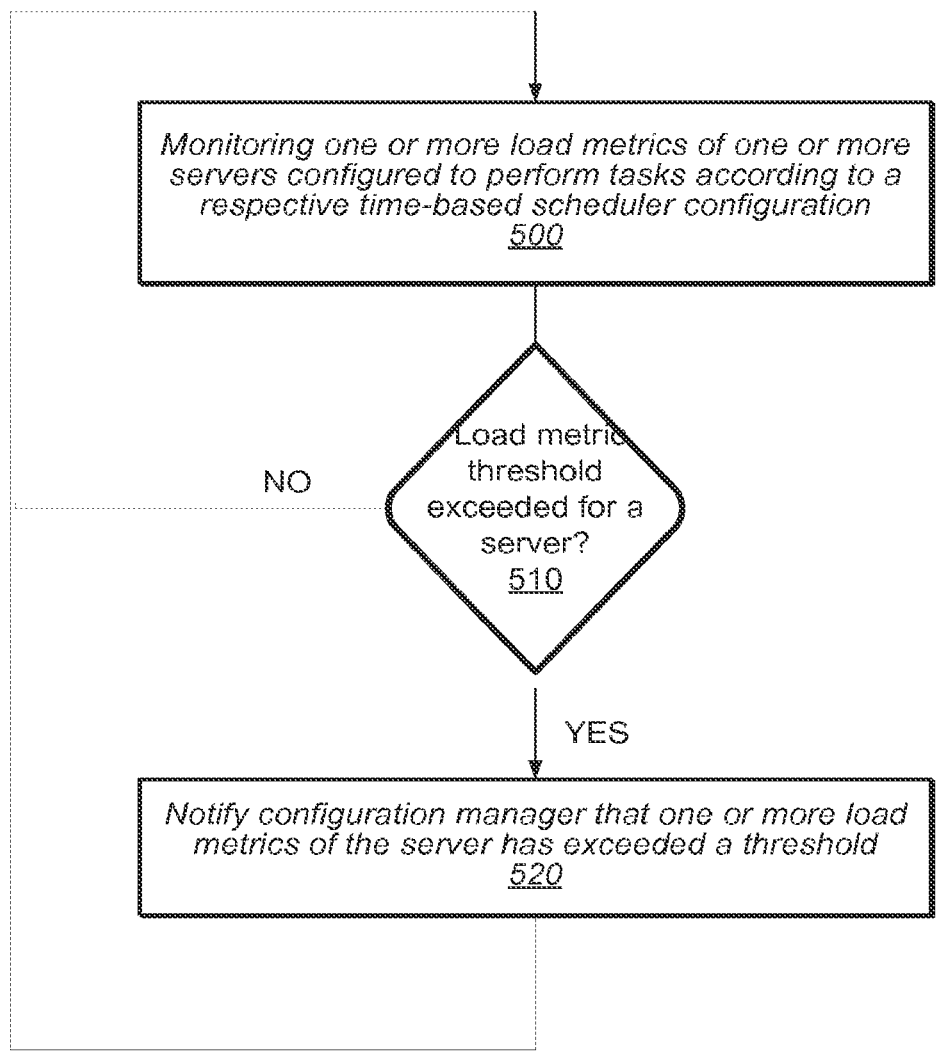
FIG. 5 is a flowchart of a method for a load monitor to monitor one or more servers, according to one embodiment.

FIG. 5 is a flowchart of a method for a load monitor to monitor one or more servers, according to one embodiment. As discussed above, one or more servers in a distributed computing system are monitored to determine the health of each respective server. Examples of load metrics that indicate the health of a server may be, but are not limited to, CPU metrics, disk usage, network bandwidth utilization, and/or memory usage. In some embodiments, the load metrics are monitored via features of the operating system (OS) (e.g., the OS implemented in servers 120 in FIG. 3). Thresholds are predetermined, in some embodiments, to indicate when a respective server has exceeded a maximum or minimum usage threshold.

As indicated in 500, in some embodiments, one or more load metrics of one or more servers configured to perform tasks according to a respective time-based scheduler configuration are monitored (e.g., by load monitor 350 in FIG. 3). As discussed above, each server (e.g., servers 120) is configured to perform one or more tasks according to a time-based task scheduler. Each task can vary thus it is not possible to pre-determine the completion time of a given job for a given task. However, monitoring the load metrics of the server can indicate the health of a server performing the tasks. As discussed above, in some embodiments, OS commands such as "top" or "mpstat" as found in Unix OS can be used to monitor the metrics of a given server. The metrics monitored may be, but are not limited to, CPU usage, memory usage, network bandwidth utilization, and/or disk usage, for example.

As indicated in 510, whether a load metric threshold is exceeded for a server is determined. If a load metric threshold is not exceeded, then the load metrics of the server continue to be monitored (e.g., in step 500). If the load metric threshold has been exceeded then, as indicated in 520, the configuration manager (e.g., configuration manager 340 in FIG. 3) is notified that one or more load metrics of the server (e.g., server 120 in FIG. 3) have exceeded a threshold.

FIG. 6 is a chart depicting a report of tasks per server in a distributed computer system, according to one embodiment. As discussed above, a distributed computing system (e.g., distributed computing system 150 in FIG. 1) is implemented with one or more servers (e.g., servers 120 in FIG. 1). Each server is configured to perform one or more tasks according to a time-based task scheduler (e.g., time-based task scheduler configuration 160 in FIG. 1). In some embodiments, a summary of the configuration of the entire distributed computing system is provided.

As depicted in FIG. 6, a report of tasks in a distributed computing system is presented. The report may be generated by a load manager, (e.g., load manager 100 in FIG. 3) by accessing a centralized configuration inventory (e.g., configuration inventory 310). The report displays the active tasks 600 by name and inactive tasks 610 by name. Inactive tasks may be tasks that are not currently implemented on one or more servers (e.g. servers 120 in FIG. 3) but are available for implementation. The task name 620 displayed under the number of active tasks by name 600 heading depicts the names of the currently active tasks found on one or more servers (e.g. servers 120 in FIG. 1) within the distributed computing system (e.g., distributed computing system 150 in FIG. 1). Each task 620 has a number of jobs 630 and a number of servers 640 indicated. For example, the first task entry, "AddActionProcessor", is implemented on one server and that server is capable of processing or retrieving five jobs corresponding to the task from a job queue (e.g. job queue 330) according to the respective time-based task scheduler. As another example, sixth task entry "Bin/php" is implemented on nine servers and those nine servers are capable of retrieving eleven jobs from a job queue at a time.

In this example embodiment of the report, it is not known which servers have the task implemented, nor is it known which servers have capacity to handle more than one job of a given task. For example, in the case of the "Bin/php" task, nine servers retrieve eleven jobs. In one embodiment, each server may have one "Bin/php" task implemented and the last server may have three "Bin/php" tasks implement. In an alternate embodiment, seven servers may have one "Bin/php" and the remaining two servers may each have two "Bin/php" implemented. It should also be noted that when the batch size for a given task is listed as zero, the task is implemented on the indicated number of servers, but the time-based task scheduler configuration is not configured to retrieve or perform that task.

In some embodiments, the report described above is displayed via a user interface. The report displayed on the user interface may also include a selectable feature to add new tasks to distributed computing system 650. A user may need to increase the number of servers implemented with a given task in preparation for future jobs, for example. In some embodiments, in response to a user selecting to add new tasks, the distributed computing system automatically determines the server to receive the implementation of the new task.

Figure 7:
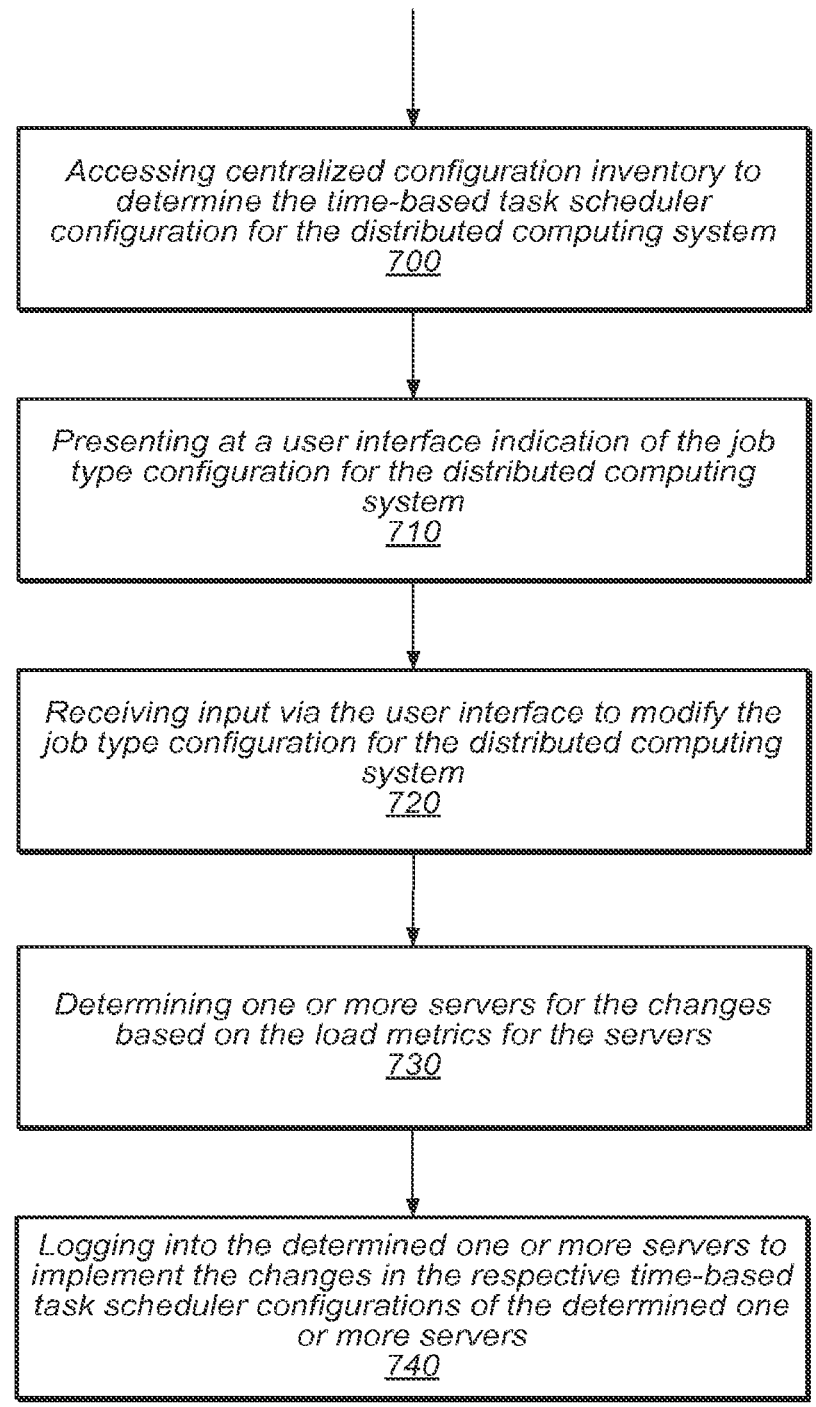
FIG. 7 is a flowchart of a method for generating a summary of tasks per server in a distributed computer system and implementing changes to a configuration via a user interface, according to one embodiment.

FIG. 7 is a flowchart of a method for generating a summary of tasks per server in a distributed computer system and implementing changes to configuration via a user interface, according to one embodiment. As discussed above, a summary of tasks per server (e.g. servers 120 in FIG. 1) in a distributed computing system (e.g., distributed computing system 150 in FIG. 1) is generated. The summary may be displayed via a user interface to provide an overview of the capabilities of the one or more servers in the distributed computing system as a whole. In some embodiments, the data may be used to determine future configurations for future loads. In other embodiments, the data may be used to analyze the trends in the tasks implemented in the distributed computing system.

As indicated in 700, in some embodiments, the centralized configuration inventory is accessed to determine the time-based task scheduler configuration for the distributed computing system. As discussed above, the time-based task scheduler configuration for each of the one or more servers in a distributed computing system is stored in a centralized configuration inventory. As discussed above, if the time-based task scheduler configuration for a given server is modified, the updated time-based task scheduler information is also modified at the centralized configuration inventory.

As indicated in 710, in some embodiments, the task type configuration for the distributed computing system is presented at a user interface. As depicted above in FIG. 6, the task name, number of servers implemented with the task and number of jobs (e.g., batch size) are presented via the user interface.

As indicated in 720, in some embodiments, the user interface receives input to modify the task type configuration for the distributed computing system. As indicated in 730, in some embodiments, one or more servers for the changes based on the load metrics for the servers are determined. As indicated in 740, the one or more servers determined to receive the changes in the task type configuration are logged into to implement the changes in the respective time-based task scheduler configuration of the determined one or more servers.

Example Computer System

Figure 8:
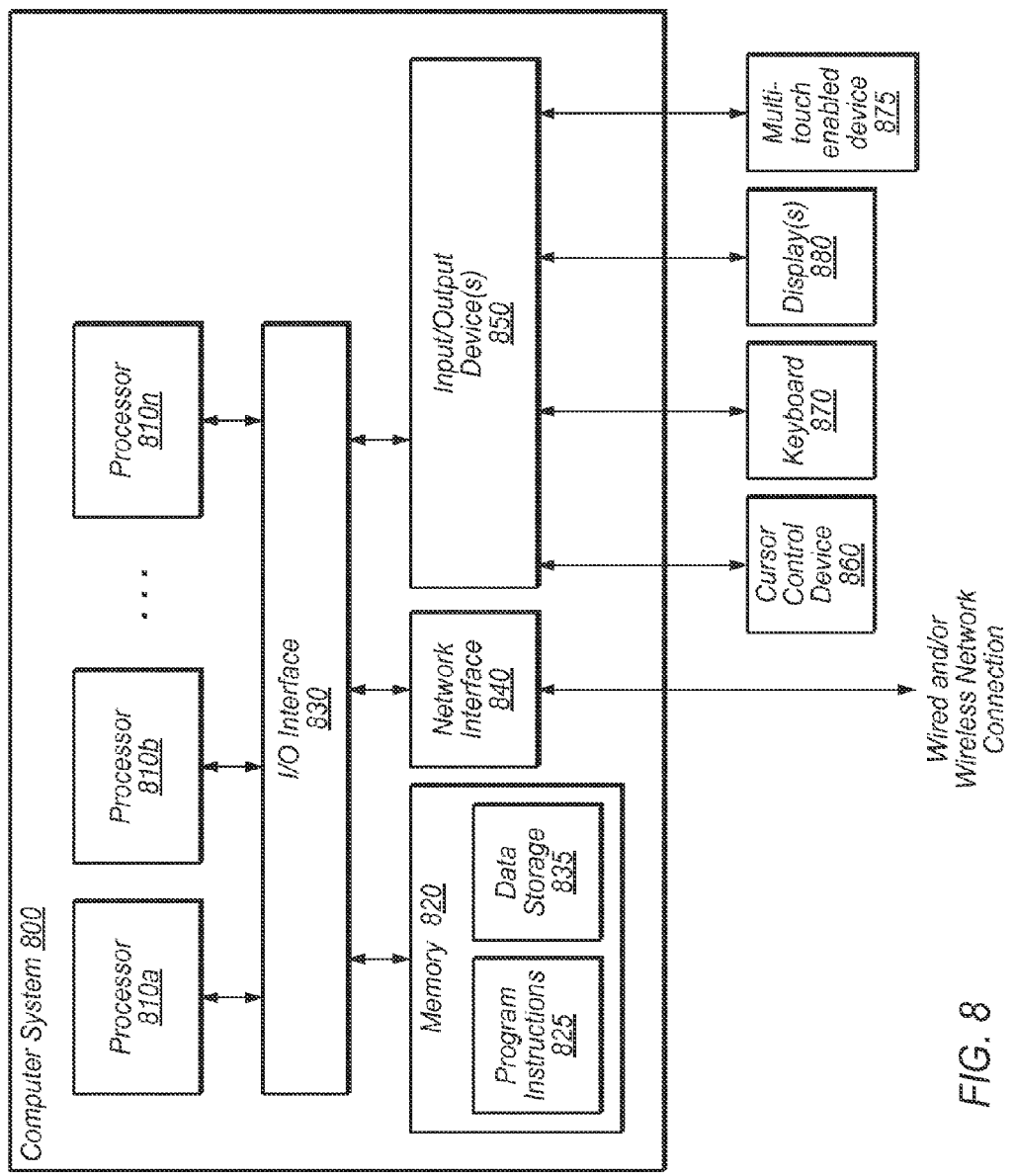
FIG. 8 illustrates a computer system, according to one embodiment.

FIG. 8 is a diagram that illustrates an exemplary computer system 800 in accordance with one or more embodiments of the present technique. Various portions of systems in FIGS. 1 and 3, methods presented in FIGS. 2, 4-5 and 7, and/or chart present in FIG. 6 and/or described herein, may be executed on one or more computer systems similar to that described herein, which may interact with various other devices of the system. For example, load manager 100, configuration manager 340 and/or load monitor 350 may be executed on a processor in a computing device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, audio device 890, and display(s) 880. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for load balancing of time-based tasks in a distributed computing system may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a load balancing of time-based tasks in a distributed computing method, are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840. Program instructions may include instructions for implementing the techniques described with respect to methods and charts depicted in FIGS. 2, 4-7.

In some embodiments, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, multi-touch screens, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Memory 820 may include program instructions 825, configured to implement embodiments of a load balancing of time-based tasks in a distributed computing method as described herein, and data storage 835, comprising various data accessible by program instructions 825. In one embodiment, program instructions 825 may include software elements of a method illustrated in the above Figures. Data storage 835 may include data that may be used in embodiments described herein. In other embodiments, other or different software elements and/or data may be included.

Those skilled in the art will appreciate that computer system 800 is merely illustrative and is not intended to limit the scope of a load balancing of time-based tasks in a distributed computing method and system as described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Therefore, the following is claimed:

1. A method for load balancing performance of time-based tasks in a distributed computing system, the method comprising:

retrieving, by a computer, a time-based task scheduler configuration from a job queue, the job queue configured at least in part from a central configuration inventory of time-based tasks for a plurality of computers in the distributed computing system, wherein the time-based task scheduler configuration indicates one or more of: a task type a respective server is configured to perform, how often each task is to be performed, and a number of jobs for a given task type the computer can retrieve from the job queue;

performing, by the computer, a time-based task according to a respective time-based task scheduler configuration that specifies execution of one or more types of time-based tasks in the computer at scheduled times, wherein the computer is one of the plurality of computers in the distributed computing system performing tasks in a load balanced configuration;

reporting, by the computer, one or more load metrics to a load manager, wherein the one or more load metrics indicate current resource utilization in the computer and exceed a threshold;

receiving, based on the one or more load metrics exceeding a threshold, a modification to the time-based task scheduler configuration to adjust a future time-based task load on the computer based on the one or more load metrics, wherein said modifying includes changing one or more of: the task type the respective server is configured to perform, the number of jobs for the given task type the computer can retrieve from the job queue, and a frequency of a task, wherein the modification is updated in the central configuration inventory; and receiving, based on (i) the one or more load metrics and (ii) a changed task type configuration being received via a load manager interface, an additional modification to the time-based task scheduler configuration that adjusts a task type performed by the computer.

2. The method of claim 1, wherein the modification to the time-based task scheduler configuration of the computer decreases the future task load on the computer in response to the one or more load metrics indicating that the computer is overloaded.

3. The method of claim 1, wherein the one or more load metrics comprises at least one of: CPU usage, memory usage, network bandwidth usage, and disk usage for the computer.

4. The method of claim 1, wherein the modification to the time-based task scheduler configuration of the computer increases the future task load on the computer in response to the one or more load metrics indicating that the computer is underutilized.

5. The method of claim 1, wherein the time-based task scheduler configuration comprises at least one of: one or more task types, a batch size for each task type, and a time-based execution schedule for each task type.

6. The method of claim 1, further comprising generating a report indicating one or more task types for the distributed computing system and a number of jobs for each task type configured to be performed by the computers in the distributed computing system.

7. A non-transitory computer-readable medium embodying a program for load balancing performance of time-based tasks in a distributed computing system, the program executable in a computer in the distributed computing system, the program comprising:
   code that retrieves a time-based task scheduler configuration from a job queue, the job queue configured at least in part from a central configuration inventory of time-based tasks for a plurality of computers in the distributed computing system, wherein the time-based task scheduler configuration indicates one or more of: a task type a respective server is configured to perform, how often each task is to be performed, and a number of jobs for a given task type the computer can retrieve from the job queue;
   code that performs a time-based task according to a respective time-based task scheduler configuration that specifies execution of one or more types of time-based tasks in the computer at scheduled times, wherein the computer is one of the plurality of computers in the distributed computing system performing tasks in a load balanced configuration;
   code that reports one or more load metrics to a load manager, wherein the one or more load metrics indicate current resource utilization in the computer and exceed a threshold;
   code that receives, based on the one or more metrics exceeding a threshold, a modification to the time-based task scheduler configuration to adjust a future task time-based load on the computer based on the one or more load metrics, wherein said modifying includes changing one or more of: the task type the respective server is configured to perform, the number of jobs for the given task type the computer can retrieve from the job queue, and a frequency of a task, wherein the modification is updated in the central configuration inventory, and
   code that receives, based on (i) the one or more load metrics and (ii) a changed task type configuration being received via a load manager interface, an additional modification to the time-based task scheduler configuration that adjusts a task type performed by the computer.

8. The non-transitory computer-readable medium of claim 7, wherein the modification to the time-based task scheduler configuration of the computer decreases the future task load on the computer in response to the one or more load metrics indicating that the computer is overloaded.

9. The non-transitory computer-readable medium of claim 7, wherein the time-based task scheduler configuration comprises at least one of: one or more task types, a batch size for each task type, and a time-based execution schedule for each task type.

10. A system for load balancing performance of time-based tasks in a distributed computing system, the system comprising:
    a computer comprising a processor and a memory; and
    a program executed in the computer, the program comprising logic that:
      retrieves a time-based task scheduler configuration from a job queue, the job queue configured at least in part from a central configuration inventory of time-based tasks for a plurality of computers in the distributed computing system, wherein the time-based task scheduler configuration indicates one or more of: a task type a respective server is configured to perform, how often each task is to be performed, and a number of jobs for a given task type the computer can retrieve from the job queue;
      performs a time-based task according to a respective time-based task scheduler configuration that specifies execution of one or more types of time-based tasks in the computer at scheduled times, wherein the computer is one of the plurality of computers in the distributed computing system performing tasks in a load balanced configuration;
      reports one or more load metrics to a load manager, wherein the one or more load metrics indicate current resource utilization in the computer and exceed a threshold;
      receives, based on the one or load metrics exceeding a threshold, a modification to the time-based task scheduler configuration to adjust a future time-based task load on the computer based on the one or more load metrics, wherein said modifying includes changing one or more of: the task type the respective server is configured to perform, the number of jobs for the given task type the computer can retrieve from the job queue, and a frequency of a task, wherein the modification is updated in the central configuration inventory; and
      receives, based on (i) the one or more load metrics and (ii) a changed task type configuration being received via a load manager interface, an additional modification to the time-based task scheduler configuration that adjusts a task type performed by the computer.

11. The system of claim 10, wherein the modification to the time-based task scheduler configuration of the computer increases the future task load on the computer in response to the one or more load metrics indicating that the computer is underutilized.

12. The system of claim 10, wherein the one or more load metrics comprises at least one of: CPU usage, memory usage, network bandwidth usage, and disk usage for the computer.

13. The system of claim 10, wherein the time-based task scheduler configuration comprises at least one of: one or more task types, a batch size for each task type, and a time-based execution schedule for each task type.

* * * * *